(12) United States Patent
Li (10) Patent No.: US 12,531,683 B2
(45) Date of Patent: Jan. 20, 2026

(54) METHOD AND APPARATUS FOR TRANSMITTING DOWNLINK POSITIONING REFERENCE SIGNAL, AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 438 days.

(21) Appl. No.: 18/000,194

(22) PCT Filed: Jun. 2, 2020

(86) PCT No.: PCT/CN2020/094005
§ 371 (c)(1),
(2) Date: Nov. 29, 2022

(87) PCT Pub. No.: WO2021/243580
PCT Pub. Date: Dec. 9, 2021

(65) Prior Publication Data
US 2023/0208580 A1 Jun. 29, 2023

(51) Int. Cl.
*H04W 72/0446* (2023.01)
*H04L 5/00* (2006.01)
(Continued)

(52) U.S. Cl.
CPC .......... *H04L 5/0048* (2013.01); *H04W 64/00* (2013.01)

(58) Field of Classification Search
None
See application file for complete search history.

(56) References Cited

U.S. PATENT DOCUMENTS

| 2018/0220392 A1 | 8/2018 | Ly |
| 2019/0297489 A1 | 9/2019 | Lei et al. |

(Continued)

FOREIGN PATENT DOCUMENTS

| CN | 101895813 A | 11/2010 |
| CN | 107360617 A | 11/2017 |

(Continued)

OTHER PUBLICATIONS

The State Intellectual Property Office of People's Republic of China, First Office Action issued in Application No. 202080001195.5, dated Nov. 15, 2021, 18 pages.

(Continued)

*Primary Examiner* — Maharishi V Khirodhar
(74) *Attorney, Agent, or Firm* — Finnegan, Henderson, Farabow, Garrett & Dunner, L.L.P.

(57) ABSTRACT

A method for transmitting a downlink positioning reference signal is performed by a terminal, and includes: receiving trigger information of the downlink positioning reference signal sent by a first network device, wherein the trigger information is configured to indicate a wireless resource position used by a specified number of transmissions of the downlink positioning reference signal; and receiving, at the wireless resource position indicated by the trigger information, the specified number of transmissions of the downlink positioning reference signal from a second network device.

14 Claims, 4 Drawing Sheets

(51) Int. Cl.
*H04W 88/08* (2009.01)
*H04W 64/00* (2009.01)

(56) References Cited

U.S. PATENT DOCUMENTS

| | | | | |
|---|---|---|---|---|
| 2021/0203460 A1* | 7/2021 | Da | .................. | H04W 72/0446 |
| 2021/0242913 A1* | 8/2021 | Manolakos | ........... | H04L 5/0091 |
| 2023/0047646 A1* | 2/2023 | Manolakos | ........... | H04W 72/23 |
| 2023/0079536 A1* | 3/2023 | Yu | ................ | H04W 24/08 |
| | | | | 370/252 |

FOREIGN PATENT DOCUMENTS

| | | |
|---|---|---|
| CN | 110635876 A | 12/2019 |
| CN | 110719148 A | 1/2020 |
| WO | WO 2017090708 A1 | 6/2017 |
| WO | WO 2018116717 A1 | 6/2018 |
| WO | WO 2020065894 A1 | 4/2020 |

OTHER PUBLICATIONS

Notice of Reasons for Refusal issued in Japanese Application No. 2022-573560, dated Aug. 1, 2023, 10 pages.
International Search Report and Written Opinion of International Application No. PCT/CN2020/094005, mailed Feb. 22, 2021, 13 pages.
Extended European Search Report issued in Application No. 20938921.2 dated Feb. 21, 2024, 11 pages.
CATT, "Discussion of NR positioning enhancements," 3GPP TSG RAN WG1 Meeting #101, R1-2003642, e-meeting, May 25-Jun. 5, 2020, 18 pages.
"Initial thoughts on Potential Positioning Enhancements", Qualcomm Incorporated, 3GPP TSG RAN WG1 #101-e, R1-2004492, e-meeting, May 25-Jun. 5, 2020, 14 pages.
Office Action issued by the Korean Patent Office on Mar. 18, 2025, in corresponding Application No. KR 10-2022-7045373, 15 pages.
"Maintenance of DL PRS for NR positioning" Huawei, HiSilicon, 3GPP TSG RAN WG1 Meeting #100-e, R1-2000190, Feb. 24-Mar. 6, 2020, 15 pages.

* cited by examiner

METHOD AND APPARATUS FOR TRANSMITTING DOWNLINK POSITIONING REFERENCE SIGNAL, AND STORAGE MEDIUM

CROSS-REFERENCE TO RELATED APPLICATION

This application is a U.S. national phase of International Application No. PCT/CN2020/094005, filed Jun. 2, 2020, the entire content of which is incorporated herein by reference.

TECHNICAL FIELD

The disclosure relates to a field of wireless communication technologies, and in particular to a method for transmitting a downlink positioning reference signal, an apparatus for transmitting a downlink positioning reference signal and a storage medium.

BACKGROUND

In a wireless communication system, a downlink positioning reference signal (PRS) is a reference signal that assists a terminal in positioning.

In the related art, in order to facilitate the positioning of the terminal at any time, a network device sends the downlink PRS to the terminal periodically. For example, relevant parameters of the downlink PRS are configured for the terminal statically or semi-statically in advance, and then the network device sends the downlink PRS periodically based on the above parameters.

SUMMARY

Embodiments of the disclosure provide a method for transmitting a downlink PRS, an apparatus for transmitting a downlink PRS and a storage medium. The technical solution will be described as follows.

In an aspect, a method for transmitting a downlink PRS is provided. The method is performed by a terminal, and includes:
 receiving trigger information of the downlink PRS sent by a first network device, in which the trigger information is configured to indicate a wireless resource position used by a specified number of transmissions of the downlink PRS; and
 receiving, at the wireless resource position indicated by the trigger information, the specified number of transmissions of the downlink PRS from a second network device.

In another aspect, a method for transmitting a downlink PRS is provided. The method is performed by a first network device, and includes:
 configuring trigger information of the downlink PRS for a terminal, in which the trigger information is configured to indicate a wireless resource position used by a specified number of transmissions of the downlink PRS; and
 sending the trigger information to the terminal.

In another aspect, a terminal is provided. The terminal includes:
 a processor; and
 a memory for storing instructions executable by the processor.

The processor is configured to:
 receive trigger information of a downlink PRS sent by a first network device, in which the trigger information is configured to indicate a wireless resource position used by a specified number of transmissions of the downlink PRS; and
 receive, at the wireless resource position indicated by the trigger information, the specified number of transmissions of the downlink PRS from a second network device.

In another aspect, a first network device is provided. The first network device includes:
 a processor; and a memory for storing instructions executable by the processor.

The processor is configured to:
 configure trigger information of a downlink PRS for a terminal, in which the trigger information is configured to indicate a wireless resource position used by a specified number of transmissions of the downlink PRS; and
 send the trigger information to the terminal.

It is understood that the above general description and the following detailed descriptions are exemplary only and do not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It should be understood that in the disclosure, "several" refers to one or more, and "plurality" mentioned refers to two or more. The term "and/or" describes the association relationship of the associated objects, indicating that there can be three types of relationships, for example, A and/or B, which means that A exists alone, A and B exist at the same time, and B exists alone. The character "/" generally indicates that the associated objects before and after are in an "or" relationship.

In a wireless communication system, such as a Long Term Evolution (LTE) system or a New Radio (NR) system, a method for positioning based on a downlink PRS measurement is a common positioning method.

When positioning based on the downlink PRS, the terminal can achieve positioning based on an arrival time difference of the downlink PRSs. For example, the terminal perform measurement on the downlink PRSs from multiple network devices to obtain a time difference between the arrival time of the downlink PRS sent by each of the multiple network devices to the terminal, so that location coordinates of the terminal can be obtained through a position estimation algorithm in combination with a position of an sending antenna of each network device and the time difference obtained in the above measurement.

A timing of the downlink PRS measurement by the terminal is determined on demand, for example, when an application in the terminal requires a positioning service, the terminal is triggered to measure the downlink PRS for positioning. In a possible implementation, the network device periodically sends the downlink PRS to the terminal, so that the terminal can perform the positioning measurement at any time. For example, if the network device is a Location Management Function (LMF) entity, the LMF entity configures PRS related parameters such as, a number of PRS transmissions within a period, a transmitting time interval, and a resource position, for the terminal statically/semi-statically via an LPP signaling. Afterwards, a base station/serving cell sends the downlink PRS periodically according to the configured parameters. Correspondingly, when the terminal needs to measure the PRS, it can receive the downlink PRS according to the related parameters mentioned above.

However, since the timing of the downlink PRS measurement by the terminal is determined on demand, the terminal will not measure the downlink PRS if there is no positioning demand. According to the above solution, the network device needs to send the downlink PRS periodically regardless of whether the terminal measures the PRS or not, which leads to a waste of wireless resources.

According to the solution shown in the following embodiments of the disclosure, a solution for transmitting a downlink PRS that can reduce the waste of wireless resources is provided.

Figure 1:
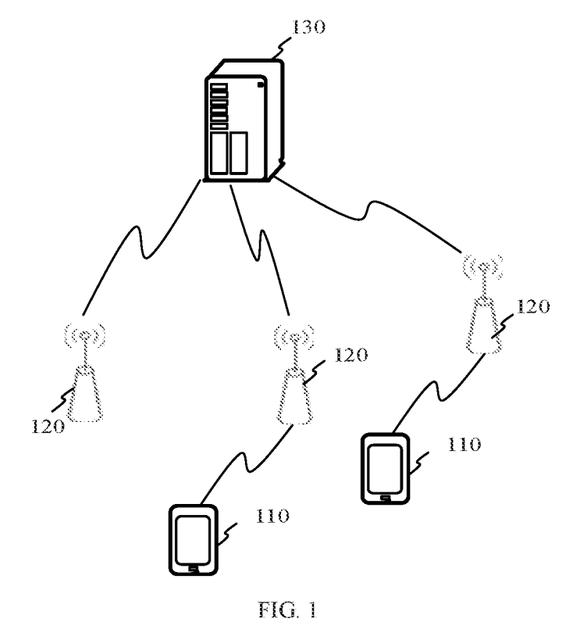
FIG. 1 is a schematic diagram of an implementation environment according to an exemplary embodiment.

FIG. 1 is a schematic diagram of an implementation environment involved by the method for transmitting a downlink PRS according to an exemplary embodiment. As shown in FIG. 1, the implementation environment may include: a plurality of terminals 110 and network devices 120.

The terminal 110 is a wireless communication device that supports various wireless access technologies. For example, the terminal 110 may support cellular mobile communication technologies, such as, the fifth generation (5G) mobile communication technology. Alternatively, the terminal 110 may support the next generation of the 5G mobile communication technology.

For example, the terminal 110 may be a user terminal device, such as a mobile phone (or "cellular" phone) and a computer with a mobile terminal. For example, the terminal 110 may be a portable, pocket, hand-held, built-in computer or vehicle-mounted mobile device, such as, a station (STA), a subscriber unit, a subscriber station, a mobile station, a mobile, a remote station, an access point, a remote terminal, an access terminal, a user terminal, a user agent, a user device, and a UE. For example, the terminal 110 may be a mobile terminal such as, a smartphone, a tablet computer, an E-book reader, an Internet of Things (IoT) device and an Industry Internet of Things (IIoT) device, or may be a smart wearable device such as, smart glasses, a smart watch or a smart bracelet.

The terminal 110 may also be a vehicle-mounted communication device such as, a vehicle-mounted computer with the wireless communication function, or a wireless communication device externally connected to a vehicle-mounted computer.

The terminal 110 may also be a roadside device such as, a street light, a signal light or other roadside device with the wireless communication function.

The network device 120 may be a network side device in the wireless communication system. The wireless communication system may also be a 5G system, also known as a NR system. The wireless communication system may also be a next generation system of the 5G system.

The network device 120 may be a base station (gNB) in the 5G system that adopts a centralized distributed architecture. The base station of the centralized distributed architecture generally includes a Central Unit (CU) and at least two Distributed Units (DU). The CU includes a protocol stack including a Packet Data Convergence Protocol (PDCP) layer, a Radio Link Control (RLC) layer and a MAC layer. The CU includes a protocol stack including a Physical (PHY) layer, and the specific implementation manner of the base station is not limited in this embodiment of the disclosure.

If the network device 120 is a base station, the network device 120 may be a base station where a serving cell currently accessed by the terminal belongs, or, the network device 120 may be a base station where a neighbor cell adjacent to the serving cell currently accessed by the terminal belongs.

The network device 120 may also be a device other than the base station. For example, in an internet of vehicles system, the network device 120 may also be a vehicle-mounted terminal device, or a roadside communication device.

A wireless connection can be established between the base station 120 and the terminal 110 through a wireless air interface. The wireless air interface is a wireless air interface based on the 5G standard, such as, an NR. Or, the wireless air interface may also be a wireless air interface based on a next generation standard of the 5G standard.

Optionally, the above wireless communication system may also include a network management device 130.

A plurality of the network devices 120 are connected to the network management device 130 respectively. The network management device 130 may be a core network device in the wireless communication system, such as, a LMF entity or a Mobility Management Entity (MME) in an Evolved Packet Core (EPC) network. The network management device may also be another core network device, such as a Serving GateWay (SGW), a Public Data Network GateWay (PGW), a Policy and Charging Rules Function (PCRF) or a Home Subscriber Server (HSS). The implementation form of the network management device 130 is not limited in this embodiment of the disclosure.

Figure 2:
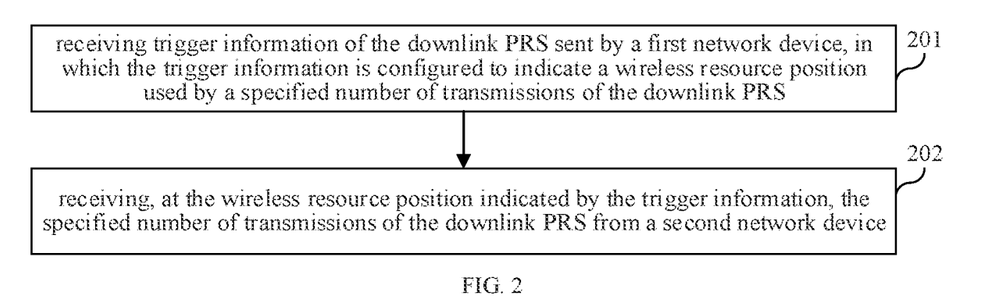
FIG. 2 is a flowchart of a method for transmitting a downlink PRS according to an exemplary embodiment.

FIG. 2 is a flowchart of a method for transmitting a downlink PRS according to an exemplary embodiment. The method for transmitting a downlink PRS may be executed by the terminal, which can be the terminal 110 in the implementation environment shown in FIG. 1. As shown in FIG. 2, the method includes the followings.

At block 201, trigger information of the downlink PRS sent by a first network device is received. The trigger information is configured to indicate a wireless resource position used by a specified number of transmissions of the downlink PRS. It is understood that the trigger information may be any indication information or control information associated with transmission of the downlink PRS implemented based on demands of the network device or terminal.

In a possible implementation, the terminal receives the trigger information of the downlink PRS sent by the first network device via a dynamic configuration signaling. The trigger information is configured to indicate the wireless resource position used by the current round of transmissions of the downlink PRS. The current round of transmissions of the downlink PRS includes a specified number of transmissions of the downlink PRS. The current round of transmissions of the downlink PRS refers to transmissions of the downlink PRS to be sent in response to the demands of the network device or terminal.

At block 202, the specified number of transmissions of the downlink PRS is received from a second network device at the wireless resource position indicated by the trigger information.

In a possible implementation, the trigger information of the downlink PRS is sent via at least one of a MAC signaling and DCI.

That is, the dynamic configuration signaling includes at least one of a MAC signaling and DCI.

In a possible implementation, the trigger information is configured to indicate a first configuration parameter, and the first configuration parameter includes at least one of a first frequency domain parameter, a first time domain parameter, and a first space domain parameter.

The first frequency domain parameter includes at least one of a frequency domain reference point, a bandwidth, a BWP, a SCS, a start PRB, a resource element offset, and a combsize.

The first time domain parameter includes at least one of a start time slot position, a start symbol position, a number of occupied symbols, a number of transmissions and a transmitting time interval.

The first space domain parameter includes at least one of an antenna port index and beam information.

In a possible implementation, the trigger information includes a parameter indication identifier.

To receive the specified number of transmissions of the downlink PRS, the method further includes:
obtaining the first configuration parameter by querying a parameter table based on the parameter indication identifier, in which the parameter table includes a correspondence between the parameter indication identifier and the first configuration parameter; and
determining the wireless resource position indicated by the trigger information based on the first configuration parameter.

In a possible implementation, to obtain the parameter table, the method further includes:
receiving the parameter table sent by the first network device via a RRC signaling or a SIB;
and/or,
receiving the parameter table sent by a LMF entity via an LPP message.

In a possible implementation, determining the wireless resource position indicated by the trigger information based on the first configuration parameter, includes:
determining, based on the first configuration parameter and a second configuration parameter, the wireless resource position indicated by the trigger information.

The second configuration parameter includes at least one of a second frequency domain parameter, a second time domain parameter, and a second space domain parameter.

The second frequency domain parameter includes any parameter other than the first frequency domain parameter in the frequency domain reference point, the bandwidth, the BWP, the SCS, the start PRB, the resource element offset and the combsize.

The second time domain parameter includes any parameter other than the first time domain parameter in the start time slot position, the start symbol position, the number of occupied symbols, the number of transmissions and the transmitting time interval.

The second space domain parameter includes any parameter other than the first space domain parameter in the antenna port index and the beam information.

In a possible implementation, to obtain the second configuration parameter, the method further includes:
receiving the second configuration parameter sent by the first network device via a RRC signaling or a SIB;
and/or,
receiving the second configuration parameter sent by the LMF entity via an LPP message.

In a possible implementation, the method further includes:
reporting terminal information of the terminal to the first network device, in which the terminal information includes at least one of a terminal type, a number of antenna ports supported by the terminal, a movement speed of the terminal and a distance between the terminal and the second network device.

In conclusion, according to the solution in the embodiments of the disclosure, after the trigger information of the downlink PRS sent by the first network device is received, the terminal receives the specified number of transmissions of the downlink PRS at the wireless resource position indicated by the trigger information. That is, in the solution of the disclosure, the wireless resource position for each round of specified number of transmissions of the downlink PRS is dynamically configured by the network device, so as to realize on-demand transmission of the downlink PRS. For example, only when the terminal needs to measure the downlink PRS, the network device configures the trigger information for the terminal and sends a round of specified number of transmissions of the downlink PRS, without the need for the network device to periodically and continuously send the downlink PRS, such that the wireless resources are greatly saved.

Figure 3:
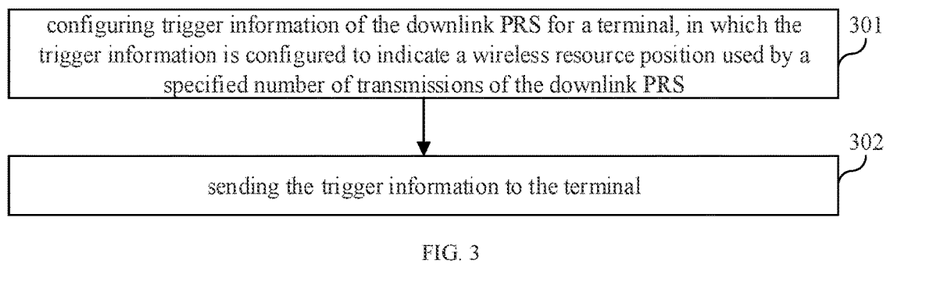
FIG. 3 is a flowchart of a method for transmitting a downlink PRS according to an exemplary embodiment.

FIG. 3 is a flowchart of a method for transmitting a downlink PRS according to an exemplary embodiment. The method for transmitting a downlink PRS may be executed by a first network device, which may be any one of the network devices 120 in the implementation environment shown in FIG. 1. As shown in FIG. 3, the method may include the followings.

At block 301, trigger information of the downlink PRS is configured for a terminal, in which the trigger information is configured to indicate a wireless resource position used by a specified number of transmissions of the downlink PRS.

In a possible implementation, the trigger information of the downlink PRS is configured for the terminal. The trigger information is configured to indicate the wireless resource position used by the current round of transmissions of the downlink PRS. The current round of transmissions of the downlink PRS includes a specified number of transmissions of the downlink PRS. Depending on the demands of the network device or terminal, one or more rounds of transmissions of the downlink PRS can be configured for the terminal.

At block 302, the trigger information is sent to the terminal.

In a possible implementation, the method further includes:
   sending, at the wireless resource position indicated by the trigger information, the specified number of transmissions of the downlink PRS to the terminal;
   and/or,
   sending the trigger information to a second network device to instruct the second network device to send the specified number of transmissions of the downlink PRS to the terminal at the wireless resource position indicated by the trigger information.

In a possible implementation, sending the trigger information to the terminal includes:
   sending the trigger information to the terminal via at least one of a MAC signaling and DCI.

That is, the first network device sends the trigger information to the terminal via a dynamic configuration signaling. The dynamic configuration signaling includes at least one of a MAC signaling and DCI.

In a possible implementation, the trigger information is configured to indicate a first configuration parameter, and the first configuration parameter includes at least one of a first frequency domain parameter, a first time domain parameter, and a first space domain parameter.

The first frequency domain parameter includes at least one of a frequency domain reference point, a bandwidth, a BWP, a SCS, a start PRB, a resource element offset, and a combsize.

The first time domain parameter includes at least one of a start time slot position, a start symbol position, a number of occupied symbols, a number of transmissions and a transmitting time interval.

The first space domain parameter includes at least one of an antenna port index and beam information.

In a possible implementation, the trigger information includes a parameter indication identifier.

To determine the wireless resource position indicated by the trigger information, the method includes:
   obtaining the first configuration parameter by querying a parameter table based on the parameter indication identifier, in which the parameter table includes a correspondence between the parameter indication identifier and the first configuration parameter; and
   determining the wireless resource position indicated by the trigger information based on the first configuration parameter.

In a possible implementation, the method further includes:
   sending the parameter table to the terminal via a RRC signaling or a SIB.

In a possible implementation, determining the wireless resource position indicated by the trigger information based on the first configuration parameter, includes:
   determining, based on the first configuration parameter and a second configuration parameter, the wireless resource position indicated by the trigger information.

The second configuration parameter includes at least one of a second frequency domain parameter, a second time domain parameter, and a second space domain parameter.

The second frequency domain parameter includes any parameter other than the first frequency domain parameter in the frequency domain reference point, the bandwidth, the BWP, the SCS, the start PRB, the resource element offset and the combsize.

The second time domain parameter includes any parameter other than the first time domain parameter in the start time slot position, the start symbol position, the number of occupied symbols, the number of transmissions and the transmitting time interval.

The second space domain parameter includes any parameter other than the first space domain parameter in the antenna port index and the beam information.

In a possible implementation, the method further includes:
   sending the second configuration parameter to the terminal via a RRC signaling or a SIB.

In a possible implementation, configuring the trigger information of the downlink PRS for the terminal includes:
   receiving terminal information reported by the terminal, in which the terminal information includes at least one of a terminal type, a number of antenna ports supported by the terminal, a movement speed of the terminal and a distance between the terminal and a second network device; and
   generating the trigger information based on the terminal information.

In conclusion, in the solution of the embodiment of the disclosure, the first network device configures the trigger information required for the specified number of transmissions of the downlink PRS for the terminal. That is, in the solution of the disclosure, the wireless resource position for each round of specified number of transmissions of the downlink PRS is dynamically configured by the network device, thereby realizing on-demand transmission of the downlink PRS. For example, only when the terminal needs to measure the downlink PRS, the network device configures the trigger information for the terminal and sends a round of downlink PRSs, so that the network device does not need to continuously and periodically send the downlink PRS, thereby greatly saving the wireless resources.

Figure 4:
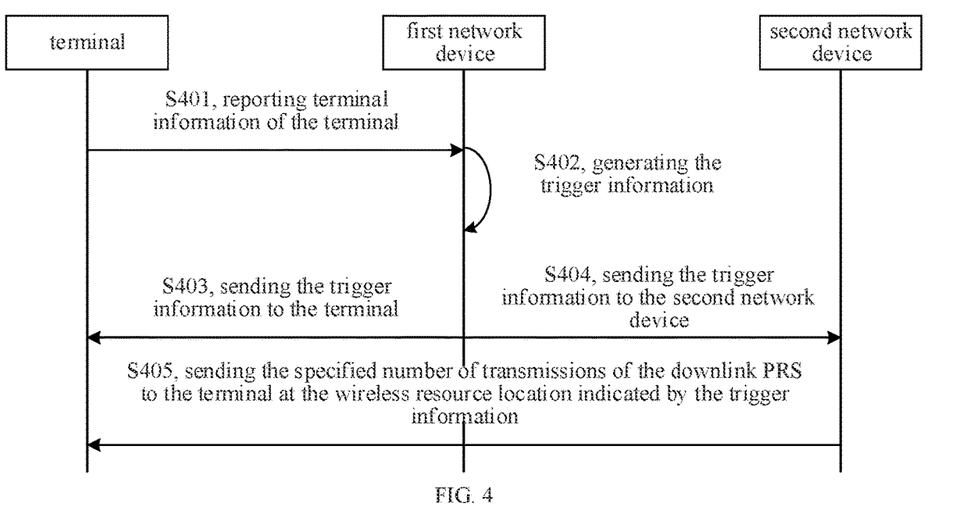
FIG. 4 is a flowchart of a method for transmitting a downlink PRS according to an exemplary embodiment.

FIG. 4 is a flowchart of a method for transmitting a downlink PRS according to an exemplary embodiment. The method for transmitting a downlink PRS may be executed by a terminal and a network device interactively. For example, the terminal may be the terminal 110 in the implementation environment shown in FIG. 1 and the network device may be the network device 120 of the terminal in the implementation environment shown in FIG. 1. As shown in FIG. 4, the method may include the followings.

At block 401, the terminal reports terminal information of the terminal to the first network device, and the terminal information is received by the first network device.

In a possible implementation, the terminal information includes at least one of a terminal type, a number of antenna ports supported by the terminal, a movement speed of the terminal and a distance between the terminal and the second network device.

The terminal type is configured to indicate a device type of the terminal. In a possible solution, the terminal type is one of a plurality of types pre-configured by the system.

For example, the terminal type is classified to mobile terminal type, vehicle type, machine, IoT device type, IIoT device type or the like. The mobile terminal type includes sub-types such as smartphone sub-type and tablet computer sub-type. The vehicle type includes sub-types such as household vehicle sub-type, public transport vehicle (e.g., bus, subway, and high-speed rail) sub-type, and engineering vehicle (e.g., forklift, concrete mixer truck, and earthwork truck) sub-type. The machine type includes parts mounting machine, and automatic retail machine.

In a possible implementation, the movement speed of the terminal is obtained by an acceleration sensor (e.g., accelerometer) of the terminal.

The movement speed of the terminal is obtained based on positions obtained by performing the positioning process twice and a time interval between the two positioning processes. For example, if the positioning process is performed at two close time points (e.g., with a 5 second interval) respectively, and the terminal travels straight ahead between the two close time points by default, an average movement speed of the terminal in the time interval between the two close time points is obtained from a distance between the two positions obtained through positioning process and the time interval between the two positioning processes.

In a possible implementation, the distance between the terminal and the second network device is obtained by the terminal through positioning. For example, the terminal obtains its location information through satellite positioning, and determines the distance between the terminal and the second network device in combination with location information of the second network device (a position of the second network device is fixed). Or, the distance between the terminal and the second network device is obtained by the terminal through the last positioning process by measuring the downlink PRS.

In a possible implementation, the distance between the terminal and the second network device is obtained by the terminal by measuring a Reference Signal Received Power (RSRP). For example, the terminal obtains the RSRP by measuring the reference signal sent by the second network device, which can be Synchronization Signal Block (SSB), Channel State Information Reference Signal (CSI-RS) and PRS. That is, the distance between the terminal and the second network device can be represented by the RSRP value.

In an example solution, the distance between the terminal and the second network device is a distance value, e.g., 500 meters, and 300 meters.

In another example solution, the distance between the terminal and the second network device is a distance interval, for example, the distance between the terminal and the second network device is indicated by three levels, namely 1, 2 and 3. Level 1 indicates that the distance between the terminal and the second network device is far, which may be greater than 100. Level 2 indicates that the distance between the terminal and the second network device is moderate, which may be between 30 and 100. Level 3 indicates that the distance between the terminal and the second network device is close, which may be less than 30. That is, in this example, the distance between the terminal and the second network device is only a rough indication indicating that the terminal is far away from or close to the second network device.

At block 402, the first network device generates the trigger information based on the terminal information.

The trigger information is configured to indicate a wireless resource position used by a specified number of transmissions of the downlink PRS.

In a possible implementation, the trigger information is configured to indicate the wireless resource position used for the current round of transmissions of the downlink PRS. That is, the current round of transmissions of the downlink PRS includes the specified number of transmissions of the downlink PRS.

In the embodiment of the disclosure, the above trigger information is configured to indicate a first configuration parameter, which includes at least one of a first frequency domain parameter, a first time domain parameter and a first space domain parameter.

The first frequency domain parameter includes at least one of a frequency domain reference point, a bandwidth, a BWP, a SCS, a start PRB, a Resource Element (RE) offset and a combsize.

The first frequency domain parameter is configured to indicate a frequency domain position of the downlink PRS. For example, the SCS is configured to indicate a subcarrier spacing. The bandwidth is configured to indicate a bandwidth over which the downlink PRS is transmitted. The BWP is configured to indicate a BWP over which the downlink PRS is transmitted. The start PRB is configured to indicate a PRB on which a start frequency domain position of the downlink PRS is located. The RE offset is configured to indicate an offset of the resource element of the downlink PRS in the PRB. The combsize is configured to indicate a frequency domain interval of the resources in which the downlink PRS is located.

The first time domain parameter includes at least one of a start time slot position, a start symbol position, a number of occupied symbols, a number of transmissions and a transmitting time interval.

The first time domain parameter is configured to indicate a time domain position of the downlink PRS. For example, the start time slot position is a time slot where the current round of transmissions of the downlink PRS starts (i.e., a time slot position where the downlink PRS is sent for the first time in the current round of transmissions of the downlink PRS). The start symbol position is configured to indicate a start symbol position of the current round of transmissions of the downlink PRS in a time slot (e.g., it indicates on which symbol in the corresponding time slot the start position of sending the downlink PRS for the first time or each time in the current round is located). The number of occupied symbols is configured to indicate the number of symbols occupied by the downlink PRS sent for each time in the current round. The number of transmissions, also known as the number of resource repetitions, is configured to indicate the number of transmissions of the downlink PRS in the current round. The transmitting time interval is configured to indicate a time interval between two adjacent transmissions of the downlink PRS in the current round of transmissions of the downlink PRS.

The first space domain parameter includes at least one of an antenna port index and beam information.

In a possible implementation, the antenna port index is configured to indicate an antenna port number for the current round of transmissions of the downlink PRS.

For a beam-based reception scene, the base station indicates a Transmission Configuration Indication (TCI) state of type D via a signaling, to inform a User Equipment (UE, i.e., the terminal) of a beam for receiving. When the UE receives any of a Physical Downlink Control Channel (PDCCH), a Physical Downlink Shared Channel (PDSCH) or a downlink PRS, the TCI is used to inform the UE that the used reception beam is the same as a reception beam of receiving an SSB, a CSI-RS or a PRS, or the TCI is used to inform the UE that the used reception beam is the same as a reception beam corresponding to a transmitting beam used by the UE to send the SRS. For example, the TCI state indicates any one of an SSB Identity (ID), a CSI-RS ID, a PRS ID and an SRS ID. When the TCI state indicates an SSB ID, a CSI-RS ID or a PRS ID, the base station instructs the UE to receive downlink transmission using a reception beam for receiving the SSB, CSI-RS or PRS corresponding to the SSB ID, CSI-RS ID or PRS ID. When the TCI state indicates an SRS ID, the base station instructs the UE to receive downlink transmission using a reception beam corresponding to a transmitting beam for sending the SRS corresponding to the SRS ID.

In the embodiment of the disclosure, before each round of transmissions of the downlink PRS to the terminal, the first network device generates the trigger information corresponding to the specified number of transmissions of the downlink PRS based on the terminal information.

In a possible implementation, the first network device generates the trigger information corresponding to the current round of transmissions of the downlink PRS based on the terminal information.

For example, when the first network device is triggered to perform a round of transmissions of the downlink PRS to the terminal, the above terminal information may be obtained and the trigger information may be generated based on the above terminal information.

For example, if the terminal information includes the terminal type, since a bandwidth size or a frequency domain range supported by different types of terminals may be different, in this case, the first network device configures the trigger information corresponding to the terminal type for the terminal, for example, the first frequency domain parameter in the configured trigger information is configured based on the frequency domain supported by the terminal type. Since different types of terminals have different requirements for positioning delay, in this case, the first network device configures the trigger information corresponding to the terminal type for the terminal. For example, the first time domain parameter in the configured trigger information is configured based on the requirement of positioning delay corresponding to the terminal type.

For another example, when the terminal information includes the number of antenna ports supported by the terminal, the first network device configures the trigger information corresponding to the number of antenna ports for the terminal. For example, the first space domain parameter in the configured trigger information is configured based on the number of antenna ports supported by the terminal.

For another example, when the terminal information includes the movement speed of the terminal, the first network device configures the trigger information corresponding to the movement speed for the terminal. For example, the first time domain information in the configured trigger information is configured based on the movement speed of the terminal, and the greater the movement speed, the shorter the time interval in the first time domain information, conversely, the smaller the movement speed, the longer the time interval in the first time domain information.

For another example, when the terminal information includes the distance between the terminal and the second network device, the second network device configures the trigger information corresponding to the distance for the terminal. For example, the first time domain information in the configured trigger information is configured based on the distance between the terminal and the second network device. For example, the closer the distance between the terminal and the second network device, the longer the time interval in the first time domain information and the smaller the number of transmissions.

The above step of generating the trigger information based on the terminal information is requested by the terminal. For example, when the terminal has a positioning requirement, it reports the terminal information to the first network device or reports a positioning request to request for a transmission of the downlink PRS. After the terminal information or the positioning request is received, the first network device can generate the above trigger information.

Alternatively, the above step of generating the trigger information based on the terminal information is initiated by the first network device. For example, when the first network device detects that the terminal has a positioning service, the first network device automatically generates the trigger information.

Alternatively, the above step of generating the trigger information based on the terminal information is initiated by a network device other than the first network device. For example, when an LMF entity detects that the terminal has a positioning service, the LMF entity requests the first network device to generate the above trigger information.

At block 403, the first network device sends the trigger information of the downlink PRS to the terminal. Correspondingly, the terminal receives the trigger information sent by the first network device.

In a possible implementation, the first network device sends the trigger information to the terminal via a dynamic configuration signaling. Correspondingly, the terminal receives the trigger information of the downlink PRS sent by the first network device via the dynamic configuration signaling.

In a possible implementation, the dynamic configuration signaling includes at least one of a MAC signaling and DCI.

In the embodiment of the disclosure, since the MAC signaling and the DCI are frequently transmitted between the terminal and the network device, the first network device can realize dynamic configuration of the downlink PRS for the terminal based on the MAC signaling and DCI, thereby enabling on-demand transmission of the downlink PRS to the terminal and improving the flexibility of transmission of the downlink PRS.

At block 404, the first network device sends the trigger information to the second network device.

In the embodiment, the trigger information instructs the second network device to perform step 405.

When the positioning process is performed by measuring the downlink PRS, the terminal generally needs to measure the downlink PRSs sent by multiple network devices simultaneously. Thus, after the first network device generates the above trigger information, it also synchronizes the trigger information to other second network devices having the capability of transmitting the downlink PRS.

For example, if the first network device is the network device corresponding to the serving cell to which the terminal is currently connected (e.g., a serving base station), the second network device may be the first network device itself, or the second network device may be a plurality of Transmission Reception Points (TRPs) in the serving cell, or the second network device may be a base station where the neighbor cell adjacent to the serving cell is located, or the second network device may be a plurality of TRPs of the neighbor cell adjacent to the serving cell, or the second network device may be a vehicle-mounted terminal device in the serving cell or the neighbor cell.

At block 405, the second network device sends the specified number of transmissions of the downlink PRS to the terminal at the wireless resource position indicated by the trigger information. Correspondingly, the terminal receives the specified number of transmissions of the downlink PRS from the second network device at the wireless resource position indicated by the trigger information.

In a possible implementation, the second network device sends the current round of transmissions of the downlink PRS to the terminal at the wireless resource position indicated by the trigger information. Correspondingly, the terminal receives the current round of transmissions of the downlink PRS from the second network device at the wireless resource position indicated by the trigger information.

In a possible implementation, in addition to the second network device, the first network device also sends the current round of transmissions of the downlink PRS to the terminal at the wireless resource position indicated by this trigger information.

The trigger information includes a parameter indication identifier. The first network device or the second network device obtains the first configuration parameter by querying a parameter table based on the parameter indication identifier. The parameter table includes a correspondence between the parameter indication identifier and the first configuration parameter. The wireless resource position indicated by the trigger information is determined by the first network device or the second network device based on the first configuration parameter.

Correspondingly, in order to determine the wireless resource position indicated by the trigger information, the terminal may obtain the first configuration parameter by querying the parameter table based on the parameter indication identifier, and determine the wireless resource position indicated by the trigger information based on the first configuration parameter.

In a possible implementation, the first network device is configured to send the parameter table to the terminal via the RRC signaling or the SIB.

In another possible implementation, the parameter table is sent to the terminal by the LMF entity via the LPP message.

Correspondingly, in order to obtain the parameter table, the terminal may receive the parameter table sent by the first network device via the RRC signaling or the SIB, and/or, receive the parameter table sent by the LMF entity via the LPP message.

In a possible implementation, when determining the wireless resource position indicated by the trigger information based on the first configuration parameter, the first network device, the second network device or the terminal determines the wireless resource position indicated by the trigger information based on the first configuration parameter and the second configuration parameter.

The second configuration parameter includes at least one of a second frequency domain parameter, a second time domain parameter, and a second space domain parameter.

The second frequency domain parameter includes any parameter other than the first frequency domain parameter in the frequency domain reference point, the bandwidth, the BWP, the SCS, the start PRB, the resource element offset and the combsize.

The second time domain parameter includes any parameter other than the first time domain parameter in the start time slot position, the start symbol position, the number of occupied symbols, the number of transmissions and the transmitting time interval.

The second space domain parameter includes any parameter other than the first space domain parameter in the antenna port index and the beam information.

In a possible implementation, the first network device or the second network device also sends the second configuration parameter to the terminal via the RRC signaling or the SIB.

In another possible implementation, the second configuration parameter is sent to the terminal by the LMF entity via the LPP message.

Correspondingly, in order to obtain the second configuration parameter, the terminal may receive the second configuration parameter sent by the first network device via the RRC signaling or the SIB, and/or, receive the second configuration parameter sent by the LMF entity via the LPP message.

In the embodiment of the disclosure, in the frequency domain parameter, the time domain parameter and the space domain parameter used for determining the wireless resource position, some parameters, such as, the frequency domain reference point, the bandwidth, the BWP, the SCS, and the start PRB in the frequency domain parameter, or such as the start time slot position, the start symbol position, and the number of occupied symbols in the time domain parameter, can be indicated to the terminal either statically or semi-statically (e.g., via the RRC signaling or the LPP message).

For some of the frequency domain parameter, the time domain parameter and the space domain parameter, the parameters are indicated to the base station through a dynamic configuration (i.e., MAC signaling or DCI).

In a possible implementation, when the parameters are indicated by the MAC signaling or DCI, a correspondence table of bit codes and parameters can be used.

Taking the time domain parameter including the number of transmissions and the transmitting time interval as an example, the correspondence is shown in Table 1.

TABLE 1

| MAC/DCI bit code | Number of transmissions | Time interval between two transmissions |
| --- | --- | --- |
| 0000 | N1 | T1 |
| 0001 | N2 | T2 |
| 0010 | N3 | T3 |
| ... | ... | ... |

In Table 1, the number of transmissions N has a minimum value, such as 2 or 4. The time interval between two transmissions in Table 1 can be the number of symbols or slots.

In a possible implementation, the first network device also indicates the slot from which the transmission is started in the MAC signaling or DCI, for example, the next slot of the slot of receiving the DCI, or the $X^{th}$ slot after the slot of receiving the MAC signaling.

Taking the frequency domain parameter including the RE offset and the combsize as an example, the correspondence is shown in Table 2.

TABLE 2

| MAC/DCI bit code | Combsize | RE offset |
| --- | --- | --- |
| 0000 | M1 | RE1 |
| 0001 | M2 | RE1 |

TABLE 2-continued

| MAC/DCI bit code | Combsize | RE offset |
| --- | --- | --- |
| 0010 | M3 | RE1 |
| ... | ... | ... |

In table 2, the combsize value can be 2, 4, 6, or 12, and the RE offset needs to provide the RE offset of each symbol occupied by the PRS, that is, the frequency domain parameter in Table 2 needs to be used in combination with the time domain parameter, such as the start symbol position and the number of occupied symbols.

Taking the space domain parameter including the antenna port index and the beam information as an example, the correspondence is shown in Table 3.

TABLE 3

| MAC/DCI bit code | port | beam information |
| --- | --- | --- |
| 0000 | Port0 | beam#0 |
| 0001 | Port1 | beam#1 |
| 0010 | Port0&port1 | beam#0&beam#1 |
| ... | ... | ... |

In table 3, port indicates the antenna port number, which can indicate one or more ports. The corresponding beam information indicates the beam information on each port, i.e., the beam information needs to indicate one or more pieces of beam information.

In addition, according to Table 3 and Table 1, the terminal needs to know exactly which port or ports and which piece or pieces of the beam information can be used at which transmission time.

According to the solution in the disclosure, the first network device can schedule the transmission for the downlink PRS based on the requirements (which include but not limited to requirements of the terminal, the base station, or the LMF entity), so that the transmission for the downlink PRS can be realized according to actual positioning requirements, thereby improving the resource use efficiency, reducing the positioning delay, and improving the positioning accuracy.

Figure 5:
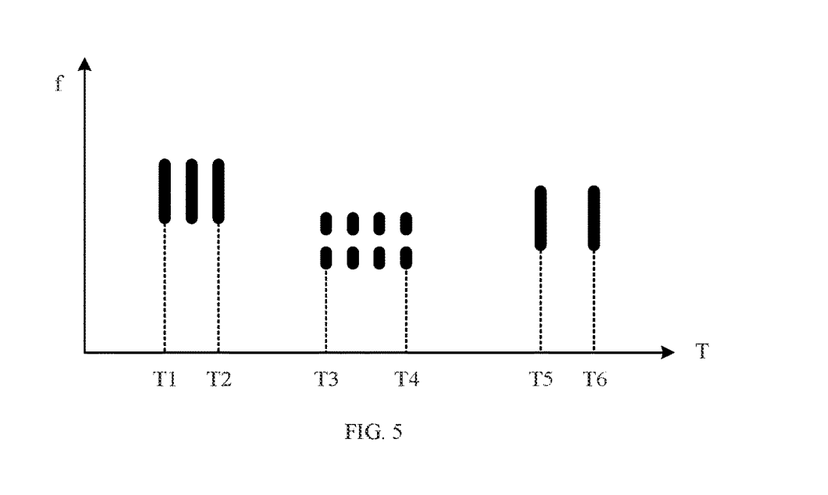
FIG. 5 is a schematic diagram of a resource occupation of a downlink PRS involved in an exemplary embodiment of the disclosure.

For example, FIG. 5 is a schematic diagram of a resource occupation of a downlink PRS involved in an exemplary embodiment of the disclosure. As shown in FIG. 5, on the time axis i.e., T axis, the first network device detects for three times that the terminal has the positioning requirement, and performs three rounds of transmissions of the downlink PRS at three time intervals, i.e., [T1, T2], [T3, T4], and [T5, T6], respectively by scheduling the trigger information. The round of transmissions of the PRS in the time interval [T1, T2] includes 3 repeated transmissions, the round of transmissions of the PRS in the time interval [T3, T4] includes 4 repeated transmissions, and the round of transmissions of the PRS in the time interval [T5, T6] includes 2 repeated transmissions. In other time intervals on the T axis, the first network device does not send the downlink PRS to the terminal, which greatly reduces the waste of resources and improves the resource usage efficiency compared to the solution of sending the downlink PRS periodically. Meanwhile, as the downlink PRS is sent on demand, there is no need for the terminal to wait for the downlink PRS sent periodically, which can reduce the positioning delay. In addition, the transmission parameters of each round of transmissions of the downlink PRS are configured dynamically, and the first network device can adjust the parameters of the downlink PRS dynamically according to the change of the state of the terminal (e.g., channel state), which enables the positioning accuracy to the maximum extent.

In conclusion, in the solution of the disclosure, the first network device configures the trigger information required for the specified number of transmissions of the downlink PRS for the terminal. That is, in the solution of the disclosure, the wireless resource position for each round of specified number of transmissions of the downlink PRS is dynamically configured by the network device, thereby realizing the on-demand transmission of the downlink PRS. For example, only when the terminal needs to measure the downlink PRS, the network device configures the trigger information for the terminal and sends a round of transmissions of the downlink PRS, so that the network device does not need to continuously and periodically send the downlink PRS, thereby greatly saving the wireless resources.

The following embodiment of the disclosure provides an apparatus that can be used to perform the method embodiment of the disclosure. For details not disclosed in the apparatus embodiment, reference can be made to the method embodiment.

Figure 6:
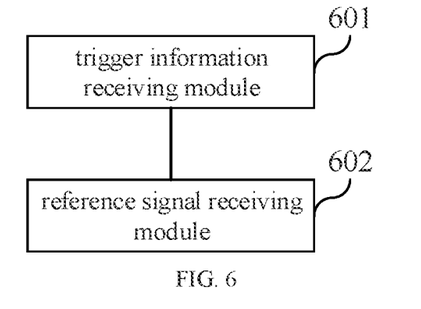
FIG. 6 is a block diagram of an apparatus for transmitting a downlink PRS according to an exemplary embodiment.

FIG. 6 is a block diagram of an apparatus for transmitting a downlink PRS according to an exemplary embodiment. As shown in FIG. 6, the apparatus for transmitting a downlink PRS can perform the steps executed by the terminal in the embodiment shown in FIG. 2 or FIG. 4. The apparatus includes: a trigger information receiving module 601 and a reference signal receiving module 602.

The trigger information receiving module 601 is configured to receive trigger information of the downlink PRS sent by a first network device, in which the trigger information is configured to indicate a wireless resource position used by a specified number of transmissions of the downlink PRS.

In a possible implementation, the trigger information is configured to indicate the wireless resource position used by the current round of transmissions of the downlink PRS. The current round of transmissions of the downlink PRS includes the specified number of transmissions of the downlink PRS.

The reference signal receiving module 602 is configured to receive, at the wireless resource position indicated by the trigger information, the specified number of transmissions of the downlink PRS from a second network device.

In a possible implementation, the trigger information of the downlink PRS is sent via at least one of a MAC signaling and DCI.

That is, the first network device sends the trigger information to the terminal by a dynamic configuration signaling, and the dynamic configuration signaling includes at least one of a MAC signaling and DCI.

In a possible implementation, the trigger information is configured to indicate a first configuration parameter, and the first configuration parameter includes at least one of a first frequency domain parameter, a first time domain parameter, and a first space domain parameter.

The first frequency domain parameter includes at least one of a frequency domain reference point, a bandwidth, a BWP, a SCS, a start PRB, a resource element offset, and a combsize.

The first time domain parameter includes at least one of a start time slot position, a start symbol position, a number of occupied symbols, a number of transmissions and a transmitting time interval.

The first space domain parameter includes at least one of an antenna port index and beam information.

In a possible implementation, the trigger information includes a parameter indication identifier.

The apparatus further includes: a first parameter obtaining module and a resource determining module.

The first parameter obtaining module is configured to obtain the first configuration parameter by querying a parameter table based on the parameter indication identifier, in which the parameter table includes a correspondence between the parameter indication identifier and the first configuration parameter.

The resource determining module is configured to determine the wireless resource position indicated by the trigger information based on the first configuration parameter.

In a possible implementation, the apparatus further includes: a parameter table receiving module.

The parameter table receiving module is configured to receive the parameter table sent by the first network device via a RRC signaling or a SIB; and/or, receive the parameter table sent by a LMF entity via an LPP message.

In a possible implementation, the resource determining module is configured to determine, based on the first configuration parameter and a second configuration parameter, the wireless resource position indicated by the trigger information.

The second configuration parameter includes at least one of a second frequency domain parameter, a second time domain parameter, and a second space domain parameter.

The second frequency domain parameter includes any parameter other than the first frequency domain parameter in the frequency domain reference point, the bandwidth, the BWP, the SCS, the start PRB, the resource element offset and the combsize.

The second time domain parameter includes any parameter other than the first time domain parameter in the start time slot position, the start symbol position, the number of occupied symbols, the number of transmissions and the transmitting time interval.

The second space domain parameter includes any parameter other than the first space domain parameter in the antenna port index and the beam information.

In a possible implementation, the apparatus further includes: a second configuration parameter receiving module.

The second configuration parameter receiving module is configured to: receive the second configuration parameter sent by the first network device via a RRC signaling or a SIB: and/or, receive the second configuration parameter sent by the LMF entity via an LPP message.

In a possible implementation, the apparatus further includes: a reporting module.

The reporting module is configured to report terminal information of the terminal to the first network device, in which the terminal information includes at least one of a terminal type, a number of antenna ports supported by the terminal, a movement speed of the terminal and a distance between the terminal and the second network device.

Figure 7:
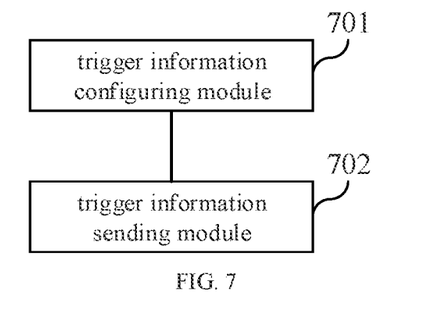
FIG. 7 is a block diagram of an apparatus for transmitting a downlink PRS according to an exemplary embodiment.

FIG. 7 is a block diagram of an apparatus for transmitting a downlink PRS according to an exemplary embodiment. As shown in FIG. 7, the apparatus for transmitting a downlink PRS can perform the steps executed by the network device in the embodiment shown in FIG. 3 or FIG. 4. The apparatus includes: a trigger information configuring module 701 and a trigger information sending module 702.

The trigger information configuring module 701 is configured to configure trigger information of the downlink PRS for a terminal, in which the trigger information is configured to indicate a wireless resource position used by a specified number of transmissions of the downlink PRS.

In a possible implementation, the trigger information is configured to indicate the wireless resource position used by the current round of transmissions of the downlink PRS. The current round of transmissions of the downlink PRS includes the specified number of transmissions of the downlink PRS.

The trigger information sending module 702 is configured to send the trigger information to the terminal.

In a possible implementation, the trigger information of the downlink PRS is sent via at least one of a MAC signaling and DCI.

That is, the first network device sends the trigger information to the terminal by a dynamic configuration signaling, and the dynamic configuration signaling includes at least one of a MAC signaling and DCI.

In a possible implementation, the trigger information is configured to indicate a first configuration parameter, and the first configuration parameter includes at least one of a first frequency domain parameter, a first time domain parameter, and a first space domain parameter.

The first frequency domain parameter includes at least one of a frequency domain reference point, a bandwidth, a BWP, a SCS, a start PRB, a resource element offset, and a combsize.

The first time domain parameter includes at least one of a start time slot position, a start symbol position, a number of occupied symbols, a number of transmissions and a transmitting time interval.

The first space domain parameter includes at least one of an antenna port index and beam information.

In a possible implementation, the apparatus further includes: a reference signal sending module, and/or, a trigger information sending module.

The reference signal sending module is configured to send, at the wireless resource position indicated by the trigger information, the specified number of transmissions of the downlink PRS to the terminal.

The trigger information sending module is configured to send the trigger information to a second network device to instruct the second network device to send the specified number of transmissions of the downlink PRS to the terminal at the wireless resource position indicated by the trigger information.

In a possible implementation, the trigger information includes a parameter indication identifier, and the apparatus further includes: a parameter table querying module and a resource determining module.

The parameter table querying module is configured to obtain the first configuration parameter by querying a parameter table based on the parameter indication identifier, in which the parameter table includes a correspondence between the parameter indication identifier and the first configuration parameter.

The resource determining module is configured to determine the wireless resource position indicated by the trigger information based on the first configuration parameter.

In a possible implementation, the apparatus further includes: a parameter table sending module.

The parameter table sending module is configured to send the parameter table to the terminal via a RRC signaling or a SIB.

In a possible implementation, the resource determining module is configured to determine, based on the first configuration parameter and a second configuration parameter, the wireless resource position indicated by the trigger information.

The second configuration parameter includes at least one of a second frequency domain parameter, a second time domain parameter, and a second space domain parameter.

The second frequency domain parameter includes any parameter other than the first frequency domain parameter in the frequency domain reference point, the bandwidth, the BWP, the SCS, the start PRB, the resource element offset and the combsize.

The second time domain parameter includes any parameter other than the first time domain parameter in the start time slot position, the start symbol position, the number of occupied symbols, the number of transmissions and the transmitting time interval.

The second space domain parameter includes any parameter other than the first space domain parameter in the antenna port index and the beam information.

In a possible implementation, the apparatus further includes: a second configuration parameter sending module.

The second configuration parameter sending module is configured to send the second configuration parameter to the terminal via a RRC signaling or a SIB.

In a possible implementation, the trigger information configuring module is configured to:
 receive terminal information reported by the terminal, in which the terminal information includes at least one of a terminal type, a number of antenna ports supported by the terminal, a movement speed of the terminal and a distance between the terminal and a second network device, and
 generate the trigger information based on the terminal information.

The exemplary embodiment of the disclosure also provides a data transmission system. The system includes at least a terminal and a first network device.

The terminal includes an apparatus for transmitting a downlink PRS in the embodiment shown in FIG. 6.

The base station includes an apparatus for transmitting a downlink PRS in the embodiment shown in FIG. 7.

It should be noted that, when the apparatus provided in the above embodiment realizes its functions, only the division of the above function modules is used as an example for illustration. In actual applications, the above functions can be allocated by different function modules according to actual needs. That is, the content structure of the apparatus is divided into different function modules to complete all or part of the functions described above.

Regarding the apparatus in the foregoing embodiment, the specific manner in which each module performs the operation has been described in detail in the embodiment of the method, and detailed description will not be given here.

An exemplary embodiment of the disclosure provides an apparatus for transmitting a downlink PRS capable of carrying out all or part of the steps executed by the terminal in the embodiment shown in FIG. 2 or FIG. 4 of the disclosure. The apparatus includes: a processor and a memory for storing instructions executable by the processor.

The processor is configured to:
 receive trigger information of the downlink PRS sent by a first network device, in which the trigger information is configured to indicate a wireless resource position used by a specified number of transmissions of the downlink PRS; and
 receive, at the wireless resource position indicated by the trigger information, the specified number of transmissions of the downlink PRS from a second network device.

An exemplary embodiment of the disclosure provides an apparatus for transmitting a downlink PRS capable of carrying out all or part of the steps executed by the first network device in the embodiment shown in FIG. 3 or FIG. 4 of the disclosure. The apparatus includes: a processor and a memory for storing instructions executable by the processor.

The processor is configured to:
 configure trigger information of the downlink PRS for a terminal, in which the trigger information is configured to indicate a wireless resource position used by a specified number of transmissions of the downlink PRS; and
 send the trigger information to the terminal.

The foregoing mainly takes the terminal and the network device as examples to introduce the solution according to the embodiments of the disclosure. It can be understood that, in order to realize the above functions, the UE includes hardware structures and/or software modules corresponding to each function. In combination with the modules and algorithm steps of the examples described in the embodiments disclosed in the disclosure, the embodiments of the disclosure can be implemented in the form of hardware or a combination of hardware and computer software. Whether a certain function is executed by hardware or computer software-driven hardware depends on the specific application and design constraint conditions of the solution. Those skilled in the art can use different methods for each specific application to implement the described functions, but such implementation should not be considered as going beyond the scope of the technical solution of the embodiments of the disclosure.

Figure 8:
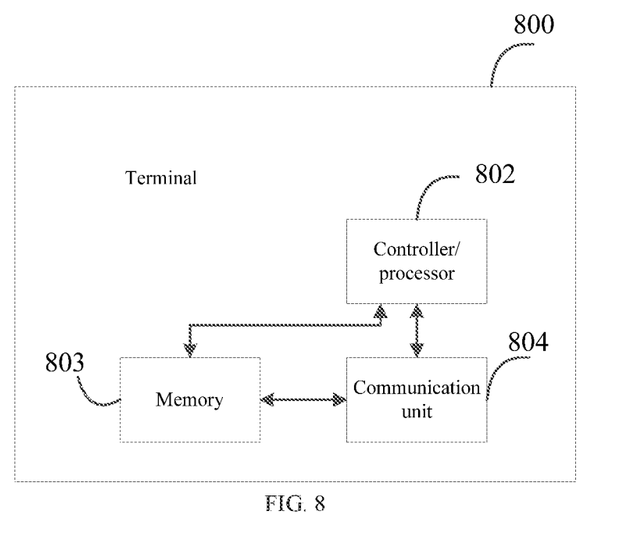
FIG. 8 is a schematic diagram of a terminal according to an exemplary embodiment.

FIG. 8 is a schematic diagram of a terminal according to an exemplary embodiment. The terminal may be implemented as the terminal 110 in the system environment shown in FIG. 1.

The terminal 800 includes a communication unit 804 and a processor 802. The processor 802 may also be a controller, which is indicated as "controller/processor 802" in FIG. 8. The communication unit 804 is used to support communication between the terminal and other network entities (e.g., other terminals or network devices).

Further, the terminal 800 may include a memory 803. The memory 803 is used to store program code and data of the terminal 800.

It is understood that that FIG. 8 illustrates only a simplified design of the terminal 800. In practice, the terminal 800 may include any number of processors, controllers, memories and communication units, and all the terminals that can implement the embodiments of the disclosure are within the protection scope of the embodiments of the disclosure.

Figure 9:
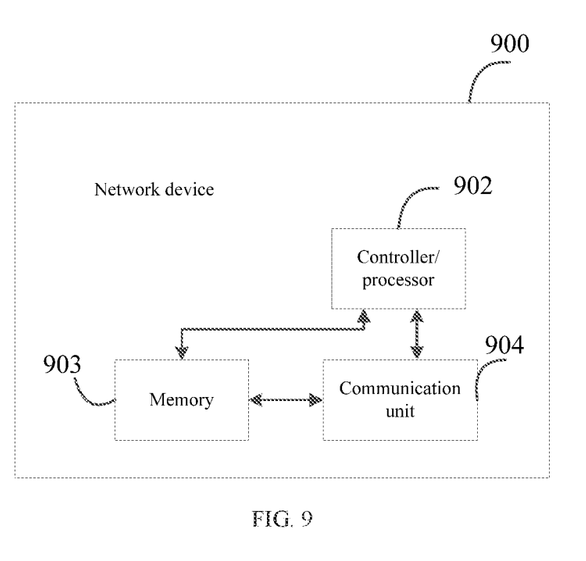
FIG. 9 is a schematic diagram of a network device according to an exemplary embodiment.

FIG. 9 is a schematic diagram of a network device according to an exemplary embodiment. The network device may be implemented as the network device 120 in the system environment shown in FIG. 1.

The network device 900 includes a communication unit 904 and a processor 902. The processor 902 can also be a controller, which is indicated as "controller/processor 902" in FIG. 9. The communication unit 904 is used to support communication between the network device and other network entities (e.g., other terminals or base stations).

Further, the network device 900 includes a memory 903, which is used to store program codes and data of the network device 900.

It is understood that FIG. 9 illustrates only a simplified design of the network device 900. In practice, the network device 900 includes any number of processors, controllers, memories and communication units, and all the network devices that can implement the embodiments of the disclosure are within the protection scope of the embodiments of the disclosure.

Those skilled in the art should be aware that in one or more of the above examples, the functions described in the embodiments of the disclosure may be implemented with hardware, software, firmware or any combination thereof. When the functions are implemented using software, these functions may be stored in a computer-readable medium or transmitted as one or more instruction or code on a computer-readable medium. The computer-readable medium includes a computer storage medium and a communication medium. The communication medium includes any medium that facilitates transmission of a computer program from one location to another. The storage medium may be any available medium that is accessible to a general or dedicated computer.

The embodiments of the disclosure also provide a computer storage medium for storing computer software instructions for use by the terminal or base station described above. The computer storage medium includes a program designed to perform the method for transmitting a downlink PRS described above.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting a downlink positioning reference signal, performed by a terminal, comprising:
    receiving trigger information of the downlink positioning reference signal sent by a first network device, wherein the trigger information is configured to indicate a wireless resource position used by a specified number of transmissions of the downlink positioning reference signal; and
    receiving, at the wireless resource position indicated by the trigger information, the specified number of transmissions of the downlink positioning reference signal from a second network device;
    wherein the trigger information is configured to indicate a first configuration parameter, and the first configuration parameter comprises at least one of: a first frequency domain parameter, a first time domain parameter, and a first space domain parameter;
    the first frequency domain parameter comprises at least one of: a frequency domain reference point, a bandwidth, a bandwidth part (BWP), a sub-carrier spacing (SCS), a start physical resource block (PRB), a resource element offset, and a combsize;
    the first time domain parameter comprises at least one of: a start time slot position, a start symbol position, a number of occupied symbols, a number of transmissions and a transmitting time interval; and
    the first space domain parameter comprises at least one of: an antenna port index and beam information;
    wherein the trigger information comprises a parameter indication identifier, and the method further comprises:
    obtaining the first configuration parameter by querying a parameter table based on the parameter indication identifier, wherein the parameter table comprises a correspondence between the parameter indication identifier and the first configuration parameter; and
    determining the wireless resource position indicated by the trigger information based on the first configuration parameter;
    wherein determining the wireless resource position indicated by the trigger information based on the first configuration parameter comprises:
    determining, based on the first configuration parameter and a second configuration parameter, the wireless resource position indicated by the trigger information;
    wherein the second configuration parameter comprises at least one of: a second frequency domain parameter, a second time domain parameter, and a second space domain parameter;
    the second frequency domain parameter comprises any parameter other than the first frequency domain parameter in the frequency domain reference point, the bandwidth, the BWP, the SCS, the start PRB, the resource element offset or the combsize;
    the second time domain parameter comprises any parameter other than the first time domain parameter in the start time slot position, the start symbol position, the number of occupied symbols, the number of transmissions or the transmitting time interval; and
    the second space domain parameter comprises any parameter other than the first space domain parameter in the antenna port index or the beam information.

2. The method of claim 1, wherein the trigger information of the downlink positioning reference signal is sent via at least one of:
    a media access control (MAC) signaling, and
    downlink control information (DCI).

3. The method of claim 1, further comprising at least one of:
    receiving the parameter table sent by the first network device via a radio resource control (RRC) signaling or a system information block (SIB); and
    receiving the parameter table sent by a location management function entity via a long term evolution positioning protocol (LPP) message.

4. The method of claim 1, further comprising at least one of:
    receiving the second configuration parameter sent by the first network device via a RRC signaling or a SIB; and
    receiving the second configuration parameter sent by a location management function entity via an LPP message.

5. The method of claim 1, further comprising:
    reporting terminal information of the terminal to the first network device, wherein the terminal information comprises at least one of: a terminal type, a number of antenna ports supported by the terminal, a movement speed of the terminal and a distance between the terminal and the second network device.

6. A method for transmitting a downlink positioning reference signal, performed by a first network device, comprising:
    configuring trigger information of the downlink positioning reference signal for a terminal, wherein the trigger information is configured to indicate a wireless resource position used by a specified number of transmissions of the downlink positioning reference signal; and sending the trigger information to the terminal;

wherein the trigger information is configured to indicate a first configuration parameter, and the first configuration parameter comprises at least one of: a first frequency domain parameter, a first time domain parameter, and a first space domain parameter;

the first frequency domain parameter comprises at least one of: a frequency domain reference point, a bandwidth, a bandwidth part (BWP), a sub-carrier spacing (SCS), a start physical resource block (PRB), a resource element offset, and a combsize;

the first time domain parameter comprises at least one of: a start time slot position, a start symbol position, a number of occupied symbols, a number of transmissions and a transmitting time interval; and the first space domain parameter comprises at least one of: an antenna port index and beam information;

wherein the trigger information comprises a parameter indication identifier, and the method further comprises:

obtaining the first configuration parameter by querying a parameter table based on the parameter indication identifier, wherein the parameter table comprises a correspondence between the parameter indication identifier and the first configuration parameter; and determining the wireless resource position indicated by the trigger information based on the first configuration parameter;

wherein determining the wireless resource position indicated by the trigger information based on the first configuration parameter comprises:

determining, based on the first configuration parameter and a second configuration parameter, the wireless resource position indicated by the trigger information;

wherein the second configuration parameter comprises at least one of: a second frequency domain parameter, a second time domain parameter, and a second space domain parameter;

the second frequency domain parameter comprises any parameter other than the first frequency domain parameter in the frequency domain reference point, the bandwidth, the BWP, the SCS, the start PRB, the resource element offset or the combsize;

the second time domain parameter comprises any parameter other than the first time domain parameter in the start time slot position, the start symbol position, the number of occupied symbols, the number of transmissions or the transmitting time interval; and the second space domain parameter comprises any parameter other than the first space domain parameter in the antenna port index or the beam information.

7. The method of claim 6, wherein sending the trigger information to the terminal comprises:

sending the trigger information to the terminal via at least one of:

a media access control (MAC) signaling, and downlink control information (DCI).

8. The method of claim 6, further comprising at least one of:

sending, at the wireless resource position indicated by the trigger information, the specified number of transmissions of the downlink positioning reference signal to the terminal; and sending the trigger information to a second network device to instruct the second network device to send the specified number of transmissions of the downlink positioning reference signal to the terminal at the wireless resource position indicated by the trigger information.

9. The method of claim 6, further comprising:

sending the parameter table to the terminal via a radio resource control (RRC) signaling or a system information block (SIB).

10. The method of claim 9, further comprising:

sending the second configuration parameter to the terminal via a RRC signaling or a SIB.

11. The method of claim 6, wherein configuring the trigger information of the downlink positioning reference signal for the terminal comprises:

receiving terminal information reported by the terminal, wherein the terminal information comprises at least one of: a terminal type, a number of antenna ports supported by the terminal, a movement speed of the terminal and a distance between the terminal and a second network device; and generating the trigger information based on the terminal information.

12. A terminal, comprising:

a processor; and a memory for storing instructions executable by the processor;

wherein the processor is configured to:

receive trigger information of a downlink positioning reference signal sent by a first network device, wherein the trigger information is configured to indicate a wireless resource position used by a specified number of transmissions of the downlink positioning reference signal; and receive, at the wireless resource position indicated by the trigger information, the specified number of transmissions of the downlink positioning reference signal from a second network device;

wherein the trigger information is configured to indicate a first configuration parameter, and the first configuration parameter comprises at least one of: a first frequency domain parameter, a first time domain parameter, and a first space domain parameter;

the first frequency domain parameter comprises at least one of: a frequency domain reference point, a bandwidth, a bandwidth part (BWP), a sub-carrier spacing (SCS), a start physical resource block (PRB), a resource element offset, and a combsize;

the first time domain parameter comprises at least one of: a start time slot position, a start symbol position, a number of occupied symbols, a number of transmissions and a transmitting time interval; and the first space domain parameter comprises at least one of: an antenna port index and beam information;

wherein the trigger information comprises a parameter indication identifier, and the processor is further configured to:

obtain the first configuration parameter by querying a parameter table based on the parameter indication identifier, wherein the parameter table comprises a correspondence between the parameter indication identifier and the first configuration parameter; and determine the wireless resource position indicated by the trigger information based on the first configuration parameter;

wherein the processor is further configured to:
determine, based on the first configuration parameter and a second configuration parameter, the wireless resource position indicated by the trigger information;
wherein the second configuration parameter comprises at least one of: a second frequency domain parameter, a second time domain parameter, and a second space domain parameter;
the second frequency domain parameter comprises any parameter other than the first frequency domain parameter in the frequency domain reference point, the bandwidth, the BWP, the SCS, the start PRB, the resource element offset or the combsize;
the second time domain parameter comprises any parameter other than the first time domain parameter in the start time slot position, the start symbol position, the number of occupied symbols, the number of transmissions or the transmitting time interval; and
the second space domain parameter comprises any parameter other than the first space domain parameter in the antenna port index or the beam information.

13. A first network device, comprising:
a processor; and
a memory for storing instructions executable by the processor;
wherein the processor is configured to perform the method of claim 6.

14. A non-transitory computer-readable storage medium having stored thereon instructions that, when executed by a processor, cause the processor to perform the method of claim 1.

* * * * *